United States Patent [19]

Heidt et al.

[11] Patent Number: 5,010,419
[45] Date of Patent: Apr. 23, 1991

[54] APPARATUS FOR STORING VIDEO SIGNALS ON AUDIO CASSETTE

[75] Inventors: Thomas Heidt, Long Valley, N.J.; James C. Wickstead, Pitney Rd. and W. Main, Mendham, N.J. 07945

[73] Assignee: James C. Wickstead, Mendham, N.J.

[21] Appl. No.: 378,749

[22] Filed: Jul. 23, 1989

Related U.S. Application Data

[63] Continuation of Ser. No. 938,087, Dec. 4, 1986, Pat. No. 4,875,107.

[51] Int. Cl.$^5$ .............................................. H04N 5/782
[52] U.S. Cl. .................................... 358/335; 360/9.1; 358/906
[58] Field of Search ................. 360/9.1; 358/133, 134, 358/906, 335, 909

[56] References Cited

U.S. PATENT DOCUMENTS

| | | | |
|---|---|---|---|
| 3,284,567 | 9/1966 | Southworth | 178/6.8 |
| 3,405,232 | 10/1968 | Morrow et al. | 360/29 |
| 3,515,800 | 6/1970 | Ebihara et al. | 178/5.4 |
| 3,564,127 | 2/1971 | Oziklai et al. | 360/9.1 |
| 3,663,749 | 5/1972 | Cannon | 178/6.8 |
| 3,683,111 | 8/1972 | Southworth | 178/6 |
| 3,792,194 | 2/1974 | Wood et al. | 178/6.8 |
| 3,848,084 | 11/1974 | Rodda et al. | 358/134 |
| 3,898,685 | 8/1975 | Engeler et al. | 357/24 |
| 3,902,187 | 8/1975 | Engeler et al. | 357/24 |
| 3,903,362 | 9/1975 | Wern et al. | 178/6.8 |
| 3,919,716 | 11/1975 | Yumde et al. | 358/134 X |
| 3,921,194 | 11/1975 | Engeler et al. | 357/24 |
| 4,010,466 | 3/1977 | Hofstein | 343/5 |

(List continued on next page.)

FOREIGN PATENT DOCUMENTS

2353097 4/1975 Fed. Rep. of Germany ...... 73/3573
2813973 10/1978 Fed. Rep. of Germany .
137242 10/1979 Japan .

OTHER PUBLICATIONS

"High Density Tape Recording of Reduced Bandwidth Television Signals", Balaban, Info. Display, Jan./Feb. 1967, pp. 23-28.

"Single Frame Video; Technology Behind UPA Newstime", Southworth, Electro Optical Systems Design, vol. 10, No. 12, Dec. 1978.

Primary Examiner—Robert L. Richardson
Attorney, Agent, or Firm—Blum Kaplan

[57] ABSTRACT

The invention is generally directed to a video apparatus for storing video images on a recording medium and replaying the stored images on a display. A camera mechanism converts light images into electrical video signals. A processor circuitry coupled to the camera mechanism includes means for converting the electronic video signals into a low bandwidth frequency modulated storage signal with the bandwidth substantially lower than in a standard television video signal. A recording mechanism coupled to the processing means stores the low bandwidth frequency modulated storage signal on an audio cassette, which has a standard speed allowing storage of an audio bandwidth signal. The recording mechanism includes a drive mechanism for driving the audio cassette at higher than normal speed to increase the bandwidth storage capacity of the audio cassette. A recording head mechanism stores the low bandwidth frequency modulated storage signal on the audio cassette. The video apparatus also includes a switch mechanism for switching the video apparatus from a record mode where video images are stored on an audio cassette to a playback mode where the stored images are read off the audio cassette and displayed on the video display. In playback mode, the low bandwidth video signal is converted to a higher frequency standard television bandwidth video signal for display. The rate conversion from a low bandwidth video signal to a standard television video signal is performed by a "ping-pong" digital memory system. The video apparatus also adjusts the sensitivity of the camera mechanism by adjusting the exposure time of the camera mechanism based on the incident light.

19 Claims, 8 Drawing Sheets

U.S. PATENT DOCUMENTS

| | | | |
|---|---|---|---|
| 4,054,921 | 10/1977 | Tatami | 360/27 |
| 4,057,836 | 11/1977 | Munsey | 358/140 |
| 4,099,179 | 7/1978 | Hofstein | 343/5 |
| 4,131,919 | 12/1978 | Lloyd et al. | 358/906 X |
| 4,141,039 | 2/1979 | Yamamoto | 358/127 |
| 4,176,916 | 12/1979 | Carpenter | 350/315 |
| 4,210,927 | 7/1980 | Yumde et al. | 358/133 X |
| 4,263,623 | 4/1981 | Woo et al. | 360/10 |
| 4,288,513 | 9/1981 | Kilichowski et al. | |
| 4,310,222 | 1/1982 | Ikemori . | |
| 4,392,159 | 7/1983 | Lemoine et al. | 358/319 |
| 4,400,717 | 8/1983 | Southworth et al. | 358/13 |
| 4,423,444 | 12/1983 | Humphreys | 360/79 |
| 4,430,675 | 2/1984 | Fujime | 358/342 |
| 4,524,381 | 6/1985 | Konishi | 358/29 |
| 4,546,390 | 10/1985 | Konishi et al. | 360/10.3 |
| 4,574,319 | 3/1986 | Konishi | 358/335 |
| 4,584,606 | 4/1986 | Nagasaki . | |
| 4,604,668 | 8/1986 | Lemelson | 360/10.1 |
| 4,620,238 | 10/1986 | Gaskell et al. | 360/8 |
| 4,646,119 | 2/1987 | Kosonocky | 357/24 |
| 4,687,282 | 8/1987 | Furrante . | |

APPARATUS FOR STORING VIDEO SIGNALS ON AUDIO CASSETTE

This is a continuation of application Ser. No. 06/938,087 filed on Dec. 4, 1986 now U.S. Pat. No. 4,875,107.

BACKGROUND OF THE INVENTION

The invention is directed to a unitary video camera recorder (camcorder) and in particular to a charge coupled device (CCD) based portable camcorder providing low resolution video and audio recording and playback at low cost.

With the explosion in production of video components and in particular video recording cameras, the combined camera recorder (camcorder) has increased in popularity. Camcorders are self-contained camera recorder units which allow recording and ususally play back, of live events. The camcorders are produced in the standard VHS, BETA and 8 MM formats used in home video cassette recording units. These camcorders utilize sophisticated circuitry and optics in an attempt to achieve recording capabilities comparable with professional video equipment. To do this, optics capable of producing a high resolution display are utilized. The circuitry is also geared to resolving a higher number of lines and the video tape stores enormous amounts of information required for the high bandwidth (2-4 MHz) needed to produce a high resolution color tv signal. The high bandwidth requirements require accurate and therefore expensive optics, circuitry and tape drive and head mechanisms for reliable functioning. These functional constraints coupled with the desire for portability significantly increase the cost of the system.

There is a need for inexpensive camcorders which function adequately with low resolution displays. The low resolution camcorders are particularly useful, if relatively inexpensive, as toys for children, as baby or child monitors, as security cameras for use in private homes and industrial locations, and for various other uses. High resolution camcorders of the type now available commercially cost in excess of $1,000. Accordingly, there is a need for a highly portable, low cost and low resolution camcorder.

SUMMARY OF THE INVENTION

The invention is generally directed to a video apparatus for storing video images on a recording medium and replaying the stored images on a display. A camera mechanism converts light images into electrical video signals. A processor circuitry coupled to the camera mechanism includes means for converting the electronic video signals into a low bandwidth frequency modulated storage signal with the bandwidth substantially lower than in a standard television video signal. A recording mechanism coupled to the processing means stores the low bandwidth frequency modulated storage signal on an audio cassette, which has a standard speed allowing storage of an audio bandwidth signal. The recording mechanism includes a drive mechanism for driving the audio cassette at higher than normal speed to increase the bandwidth storage capacity of the audio cassette. A recording head mechanism stores the low bandwidth frequency modulated storage signal on the audio cassette. The video apparatus also includes a switch mechanism for switching the video apparatus from a record mode where video images are stored on an audio cassette to a playback mode where the stored images are read off the audio cassette and displayed on the video display. In playback mode, the low bandwidth video signal is converted to a higher frequency standard television bandwidth video signal for display. The rate conversion from a low bandwidth video signal to a standard television video signal is performed by a "ping-pong" digital memory system. The video apparatus also adjusts the sensitivity of the camera mechanism by adjusting the exposure time of the camera mechanism based on the incident light.

Accordingly, it is an object of the invention to provide an improved camcorder.

Another object of the invention is to provide an improved low cost, low resolution camcorder.

A further object of the invention is to provide an improved camcorder which utilizes a CCD array to receive the incoming light and audio tape to record the low resolution picture signal and audio signal.

A further object of the invention is to provide an improved camcorder which uses a low resolution CCD array which operates slower than the TV frame rate to reduce the bandwidth and corresponding storage requirements to allow use of increased speed standard audio cassette tape as a storage medium.

Another object of the invention is to provide a CCD based camcorder utilizing an automatic irising system which controls the exposure time and thus improves contrast under varying light conditions.

Yet a further object of the invention is to provide an improved camcorder which utilizes a "ping-pong" type output based on a two frame RAM to convert from a slow scan to standard television scan rates.

Still another object of the invention is to provide an improved camcorder utilizing an aspheric lens which allows for fixed focusing from as close as an inch out to infinity.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a further understanding of the invention, reference is had to the following description taken in connection with the accompanying drawings, in which.

DETAILED DESCRIPTION OF THE PREFERRED EMBODIMENTS

Figure 1:
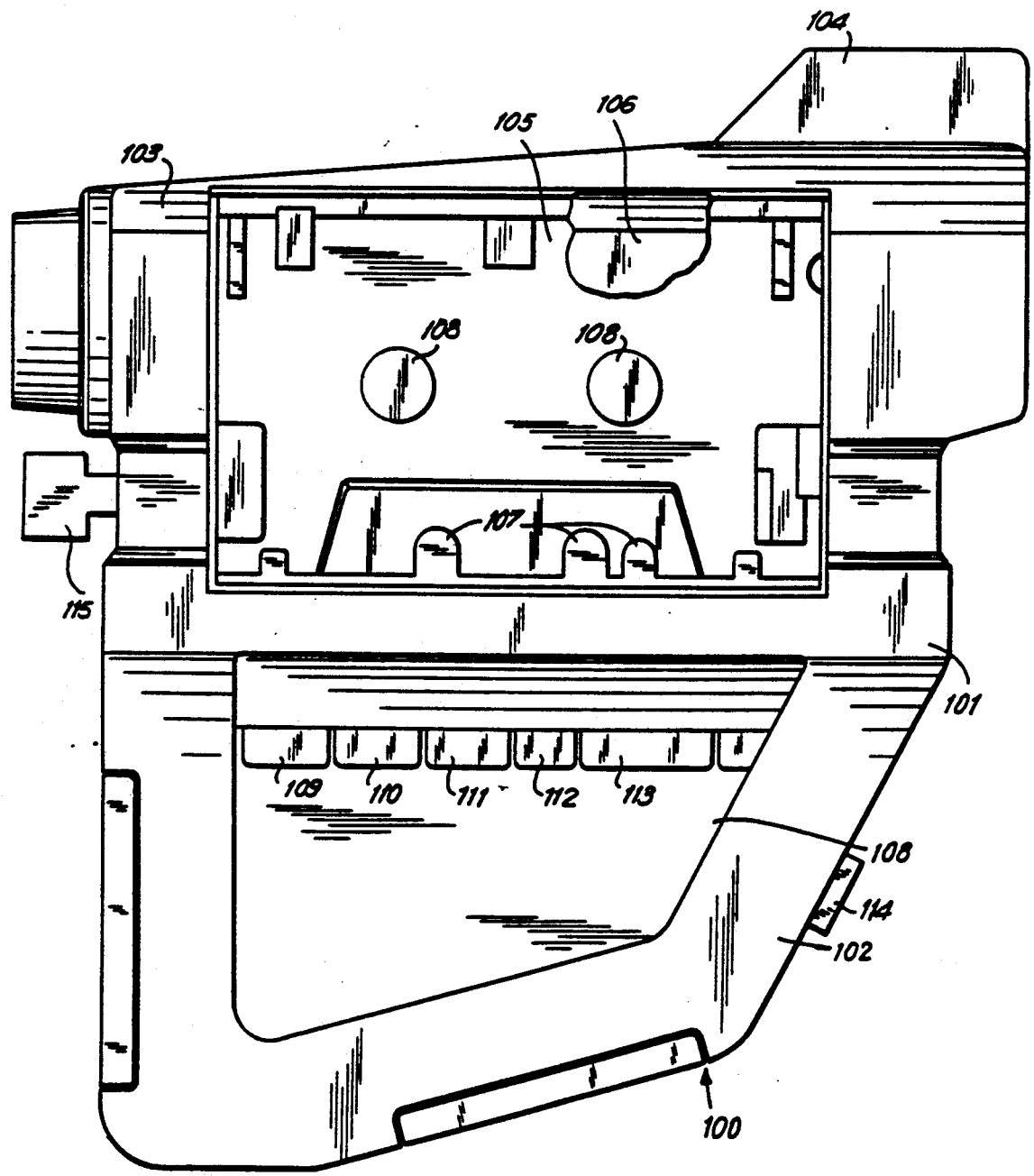
FIG. 1 is a side elevational view of a camcorder constructed in accordance with a preferred embodiment of the invention.

Reference is made to FIG. 1 wherein a camcorder, generally indicated as 100 constructed in accordance with a preferred embodiment of the invention is depicted. Camcorder 100 has a case 101 which includes a handle portion 102. Camcorder 101 has an optical input portion 103 and a view finder 104. Camcorder 100 has a tape compartment 105 sized to receive a standard audio cassette. Tape compartment 105 is closed by a tape compartment door 106 which is hinged at the top and protects the tape heads 107. The tape compartment also includes drive shafts 108 used to advance the tape within the cassette. Handle 102 defines an interior space 108 to allow the user to easily hold the handle. Interior space 108 also protects control buttons 109, 110, 111, 112, 113 and 114 which are used to control record/play back operation, tape movement and tape ejection. A microphone 115 is used to receive sound for recording on the tape.

Camcorder 100 is adapted to be held and operated with one hand. The user sights the subject through viewfinder 104, presses the appropriate control button to begin recording and follows the subject through the viewfinder. The recording process can be stopped, the tape rewound and the recorded video signal output for display on a television or specially designed monitor.

Figure 2:
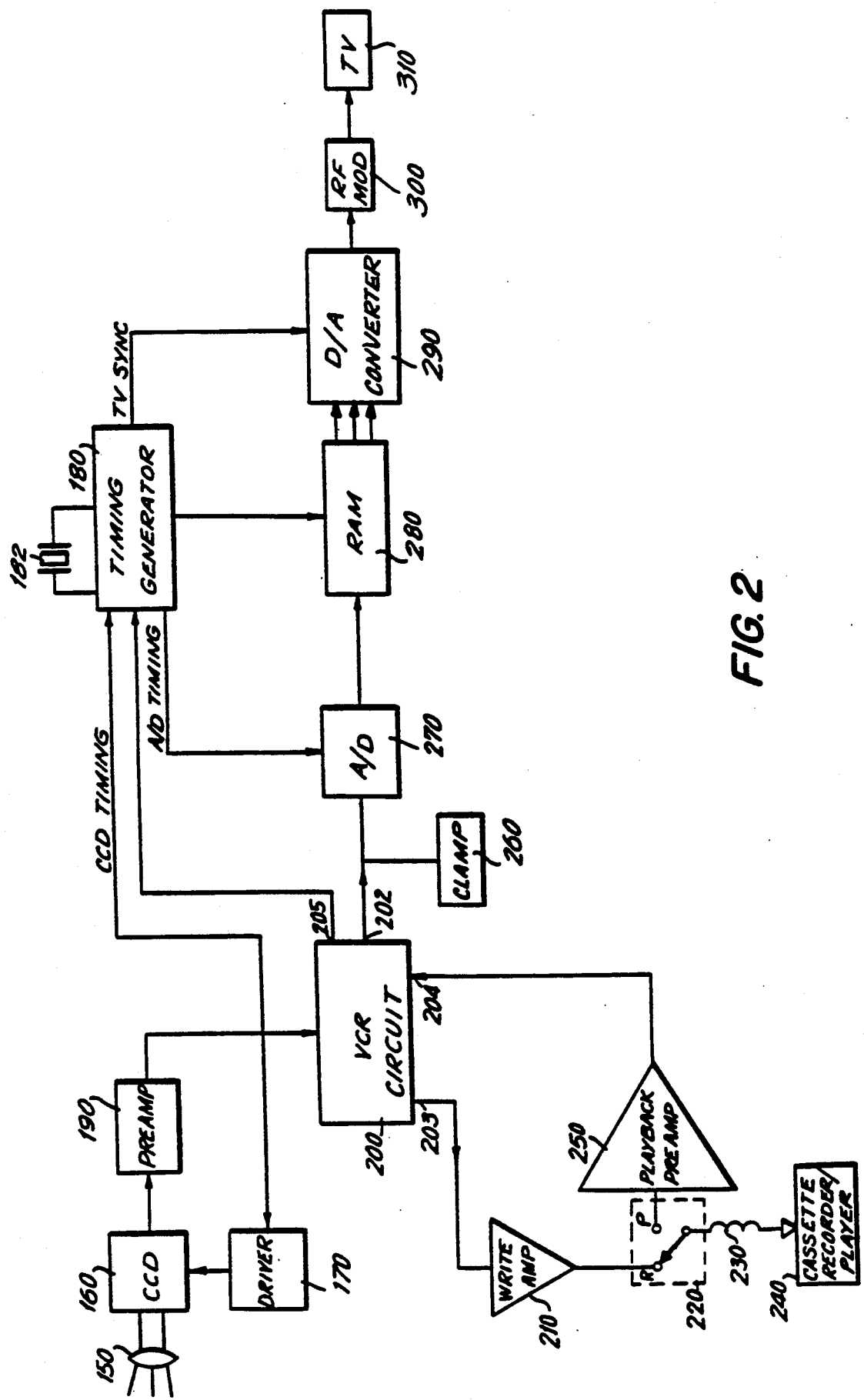
FIG. 2 is a functional block diagram of the camcorder constructed in accordance with a preferred embodiment of the invention.

Reference is made to FIG. 2 wherein a functional block diagram of a camcorder, generally indicated as 100, constructed in accordance with a preferred embodiment of the invention is depicted. Camcorder 100 includes a lens 150. In a preferred embodiment, lens 150 is an aspheric lens. The incoming light ravels an optical path through lens 150 and contacts charge coupled device (CCD) array 160. The CCD array is a 90×120 element matrix for a black and white picture although color images can also be produced. This creates 10,800 pixels, about one quarter of the pixels in a standard television system. CCD array 160 is driven by a CCD driver 170 controlled by a timing generator 180. Driving generator 180 is synchronized by a crystal 182. Timing generator 180 also produces other timing signals used throughout camcorder 100. CCD array 160 generates a video output by integrating the light to which the pixels are exposed which is amplified by a preamplifier 190. CCD array 160, which is a frame transfer device, generally has an output on the order of 100 mv. In the preferred embodiment preamplifier 190 amplifies the CCD array output by a factor of five to provide a 0.5 V peak to peak output voltage.

The amplified video signal is then input to a video cassette recorder (VCR)circuit 200. VCR circuit 200, which in a preferred embodiment is a VLSI chip, described in greater detail with respect to FIG. 7, includes circuitry for processing the video input signal received from CCD array 160 into an FM signal suitable for storage on magnetic tape. VCR circuitry 200 receives horizontal sync pulse at input terminal 202 from timing generator 180. VCR chip 200 outputs the frequency modulated signal to a write amplifier 210 which amplifies the signal to an appropriate level.

The output of the write amplifier 210 is stored on magnetic audio tape in cassette recorder/player 240. A record/playback switch 220 and head 230 are between write amplifier 210 and cassette recorder/player 240. Cassette recorder/player 240 is adapted to record and play on standard audio cassettes which ordinarily have a clean bandwidth of about 12-15 kHz. Cassette recorder/player 240 drives the audio tape about eight times faster than the standard cassette rate of 1⅞ inches per second. This results in a clear bandwidth in excess of about 100 kHz on the standard audio cassette. This bandwidth is compared with the 2-4 MHz bandwidth of standard color TV signals.

For playback, cassette player 240 is operated in its playback mode and switch 220 is switched from its record to its playback position. This connects head 230 to playback preamplifier 250 rather than write amplifier 210. Head 230 outputs a signal to playback preamplifier 250. Playback preamplifier 250 amplifies the signal output from cassette recorder/player 240 to a level appropriate for VCR chip 200 at tape input terminal 204. VCR Chip 200 converts the stored signal into a video signal which is output at video output terminal 205. The video signal output from video output terminal 205 has black levels fixed to an appropriate level by clamping circuit 260. The clamped video signal is then fed into an analog to digital (A/D) converter circuit 270 which converts the analog video signal into a digital video signal. A/D circuit 270 receives timing signals from timing generator 180. The A/D timing signals are synchronous with the timing for a pixel and are successive approximation signals so that the digital signals output from A/D converter 270 can be fed pixel by pixel into the random access memory (RAM) 280.

RAM 280 is configured to hold two complete frames of video information. While one frame is receiving, pixel-by-pixel the digital video information, the other frame of video information is output to television 310 through digital to analog (D/A) converter 290, which receives the television sync signals from timing generator 180. The analog signal is transmitted to television 310 through RF modulator 300.

The 90-100 kHz bandwidth of camcorder 100, as compared to the 2-4 MHz bandwidths of standard color television broadcasts, allows for significant reductions in speeds of the various components and thus, decreased costs. However, the reduced bandwidth also reduces the information which can be transmitted within a given time period. As a result, a reduced resolution picture is created. To increase the resolution of the image at the reduced bandwidth, VCR circuit 200 takes longer than the standard TV scanning time for a signal frame to output a full frame of pixel information to RAM 280. In practice a full frame of pixels is transmitted from VCR circuit 200 to RAM 280 in the time a standard television would display four frames. As a result, while one frame in RAM 280 is receiving a new video image, television 310 is repeatedly displaying the image stored in the other frame of RAM 280. The output of video signals from RAM 280 utilizes a ping pong type effect. When frame one in RAM 280 receives new video information from VCR circuit 200 the video image stored in frame two is output and displayed on TV 310. As soon as frame one has a complete image, signaled by the vertical sync pulse produced by timing generator 180 the video image in frame one is output to television 310 and he next video image is input to frame two. Thus, when frame two has received a complete new video image, that image is output to television 310 and frame one begins receiving another video frame. In this way the resolution of the video signal is improved beyond the bandwidth capacity for a real time television system while allowing display on a standard television. This type of system is known as slow scan TV because there is reduced dynamic imaging due to the repetitive display of screens.

In the preferred embodiment the video system operates with a rate of 180 kHz which results in 5.5 $\mu$s/pixel although variations in this rate are suitable.

Figure 3:
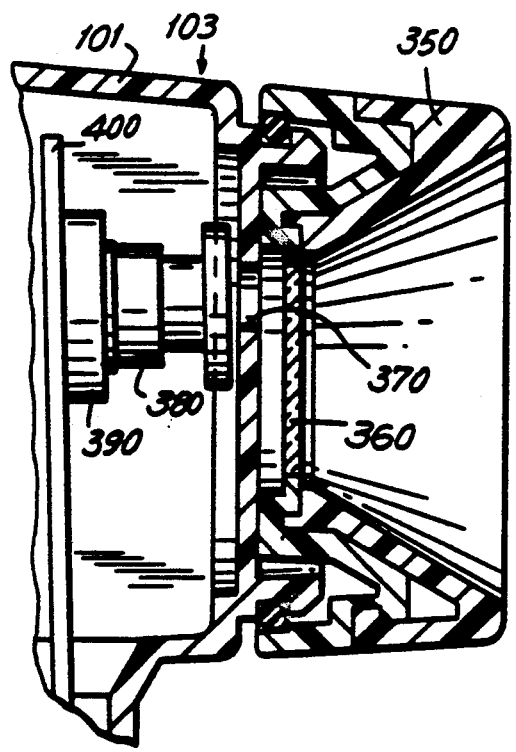
FIG. 3 is an enlarged side elevational view, partially cut away, of the optical system of the camcorder constructed in accordance with a preferred embodiment of the invention.

Reference is next made to FIG. 3 wherein a cut-away side elevational view of optical portion 103 of camcorder 100 is shown in greater detail. A CCD array chip 390 is secured to a PC board 400. The CCD array has an output level of approximately 100 mV. A lens holder 380, which secures the lens in place and aligns the lens with the CCD array, is coupled to the CCD array 390. An opening 370 in case 101 is aligned with lens holder 380 to allow light to contact lens holder 380 for transmission to CCD array 390. A protective layer 360 seals off opening 370 and lens holder 380 from the exterior. Protective layer 360 may be a clear plastic or include a filter. In either case protective layer 360 protects the lens and CCD array from damage and dust which would significantly degrade the picture quality. The light contacting the active portion of CCD array 390 is transmitted through only a small portion of protective layer 360. Accordingly, a variety of filters for different light conditions may be incorporated in protective layer 360 and rotation of layer 360 to place the appropriate portion in front of CCD array 390 may be utilized.

A flared section 350, coupled to the exterior of case 101 surrounds protective layer 360. A lens cap (not shown) can be utilized to further protect protective layer 360 and the other optical components when the camcorder is not in use.

Figure 4:
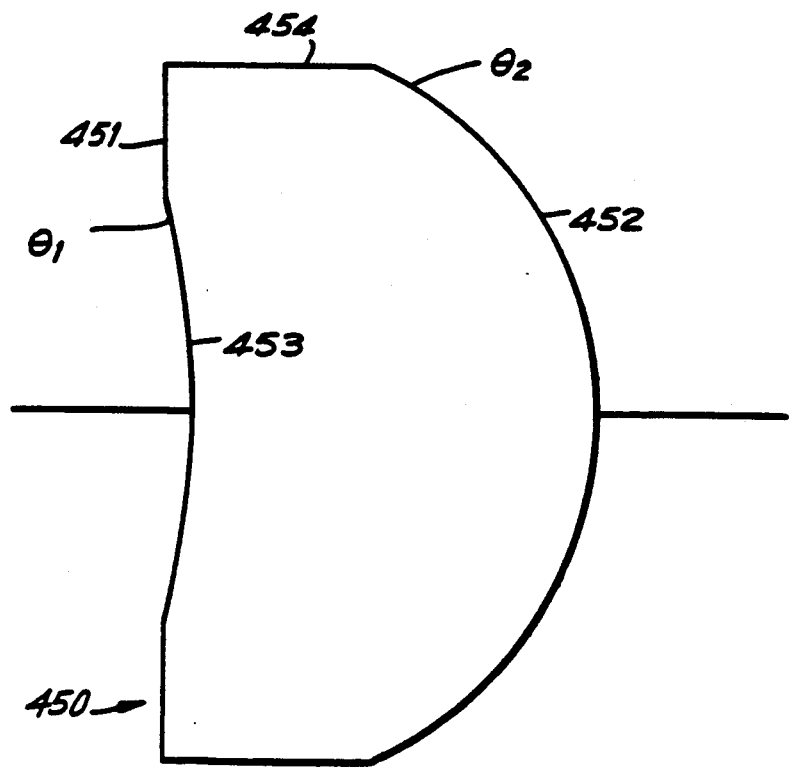
FIG. 4 is a side elevational view of an aspheric lens utilized in the, optical system of the camcorder.

Reference is next made to FIG. 4 wherein a side elevational view of a lens 450 constructed in accordance with a first embodiment of the invention is depicted. Lens 450 has a front face 451 and a back face 452. Light enters lens 450 through front face 451, proceeding through lens 450 and exiting through back face 452. Lens 450 is an aspheric lens of circular cross section with the diameter of edge 454 being about 2.75 mm and the thickness from face 451 to the furthest point of surface 452 being about 1.5 mm. As a result of these small dimensions, the use of a lens holder 380, described above, is essential to assure proper and reliable alignment and safety of the lens.

Lens 450 includes a shallow, concave aspheric front surface located at the center of curvature of a spherical back surface 452. As a result, the center thickness of lens 452 is equal to the radius of back surface 452. The radius of curvature of concave aspherical front surface 453 identified as $\theta_1$ is approximately 0.8 mm. The radius of curvature of back surface 452, identified as $\theta_2$ is about 1.6 mm. This design produces a lens which has a fixed focus from about one inch out to infinity. The image field about three feet away from the lens is approximately 20 inches by 15 inches. The lens may be made of a variety of materials. However, in a preferred embodiment the lens 450 is manufactured as a single acrylic piece with a yellow tint which filters out more than 85 percent of the light having wave lengths less than 520 nm.

Figure 5:
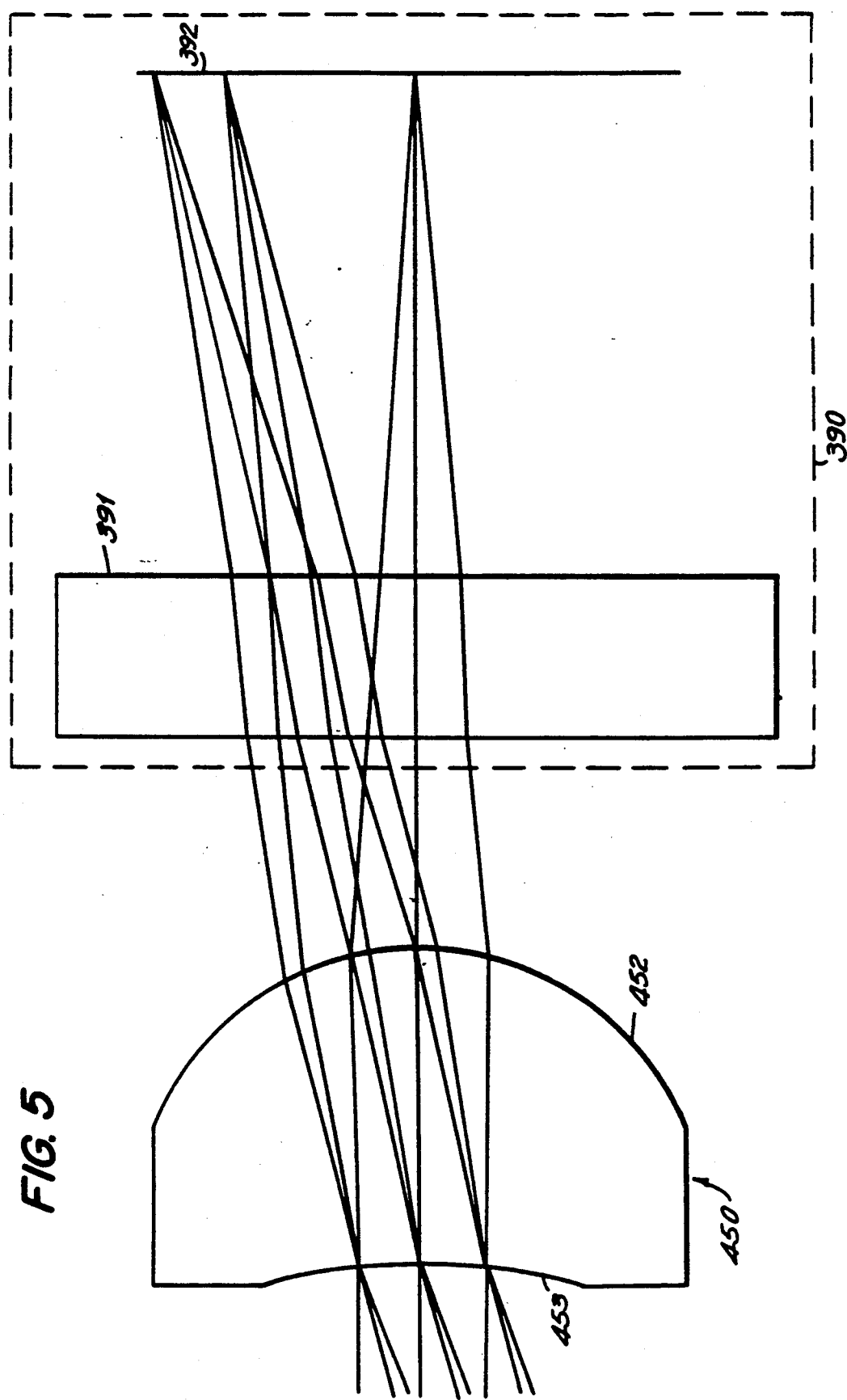
FIG. 5 is a schematic side elevational view of the aspheric lens, CCD window and CCD surface in accordance with a preferred embodiment of the optical system.

Reference is next made to FIG. 5 wherein a schematic side elevational view of the optical system constructed in accordance with a first preferred embodiment of the invention is depicted. The optical system includes lens 450 and CCD array 390. CCD array 390 includes a CCD window 391 through which light passes and CCD surface 392 where the incident light is integrated into electrical signals. In a preferred embodiment the CCD window 391 is approximately 0.77 mm thick and is placed no more than 2.0 mm in front of CCD surface 392. As a result, the back focal length requirement of surface 452 must be greater than 2.8 mm. The portion of lens 450 through which light will pass and contact CCD surface 392 is smaller than aspheric concave portion 453. Surface 453 is made significantly larger than necessary to minimize distortion effects at the corners of the field. In accordance with the depicted arrangement the distortion is less than four percent in the corners of the field. This compares favorably with the corner distortion in many home video cameras which exceeds six percent at times. The lines in FIG. 5 indicate the manner in which light is transmitted through lens 450 to CCD surface 392.

The extremely compact design of aspheric lens 450 and CCD array 390 significantly cuts the cost of producing camcorder 100. Aspheric lens 450 provides all of the optics required. Protective layer 360 seals the area around lens 450 and CCD array 390. Because of the almost microscopic dimensions of these elements any dust or smudges on the lens would significantly impair performance. However, with protective layer 360 in place and flared section 350 extending outwardly the optical system is well protected. Lens 450 operates at F/5.6 with the optical system as configured.

Figure 6:
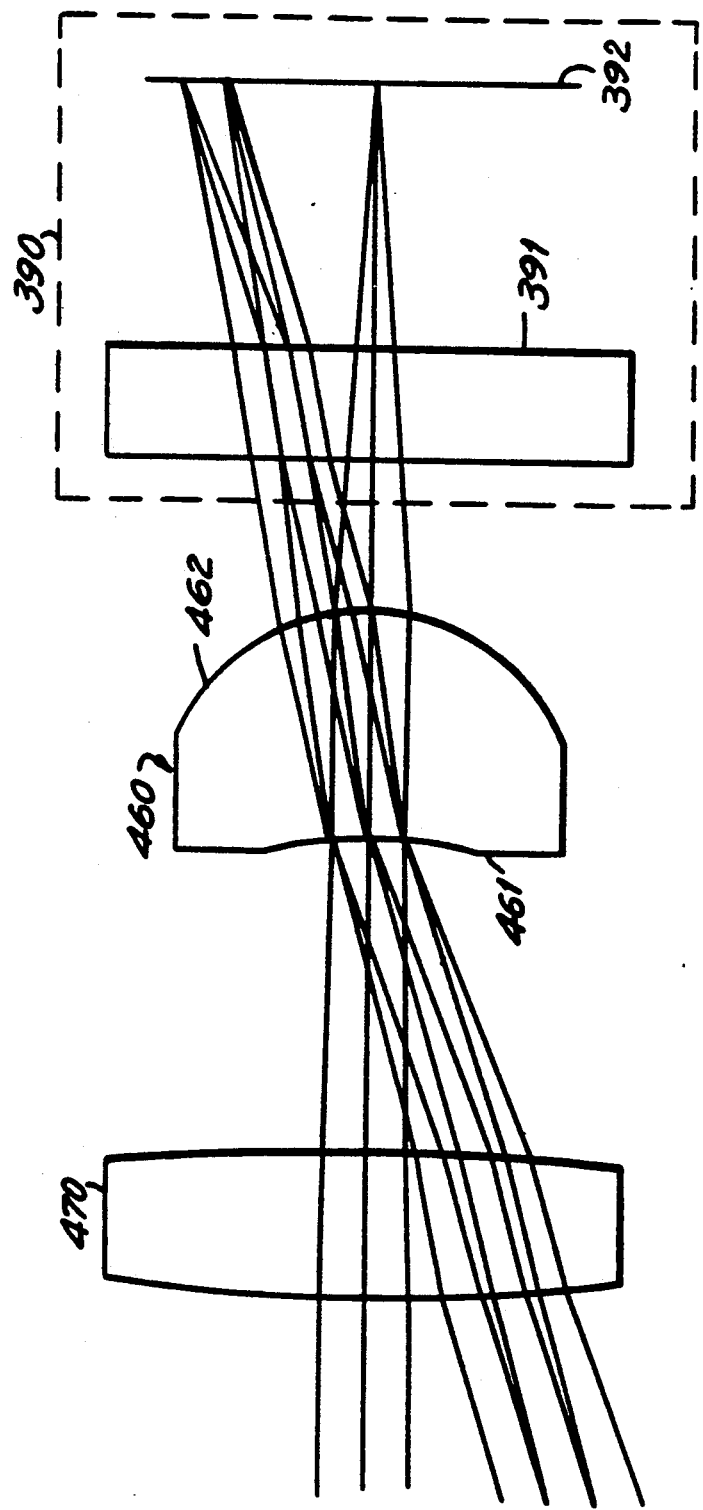
FIG. 6 is a schematic side elevational view similar to FIG. 5 of a lens array, CCD window and CCD surface constructed in accordance with a second embodiment of the optical system.

Reference is next made to FIG. 6 wherein an optical system constructed in accordance with a second preferred embodiment of the invention is depicted. The optical system still includes CCD array 390 with window 391 and CCD surface 392. However, instead of single lens 450, the embodiment of FIG. 6 includes two lenses 460 and 470. Lens 460 has a back surface 462 similar to back surface 452 of lens 450. However, the front surface 461 of lens 460 is not aspheric in shape. A separate lens 470 is used to provide the correction to compensate for the correction provided by aspheric concavity 453 in lens 450 of the first embodiment. The advantage of the embodiment of FIG. 5 is the single lens which minimizes the cost of assembly and obviates the precise alignment required between lenses 460 and 470 in FIG. 6.

Figure 7:
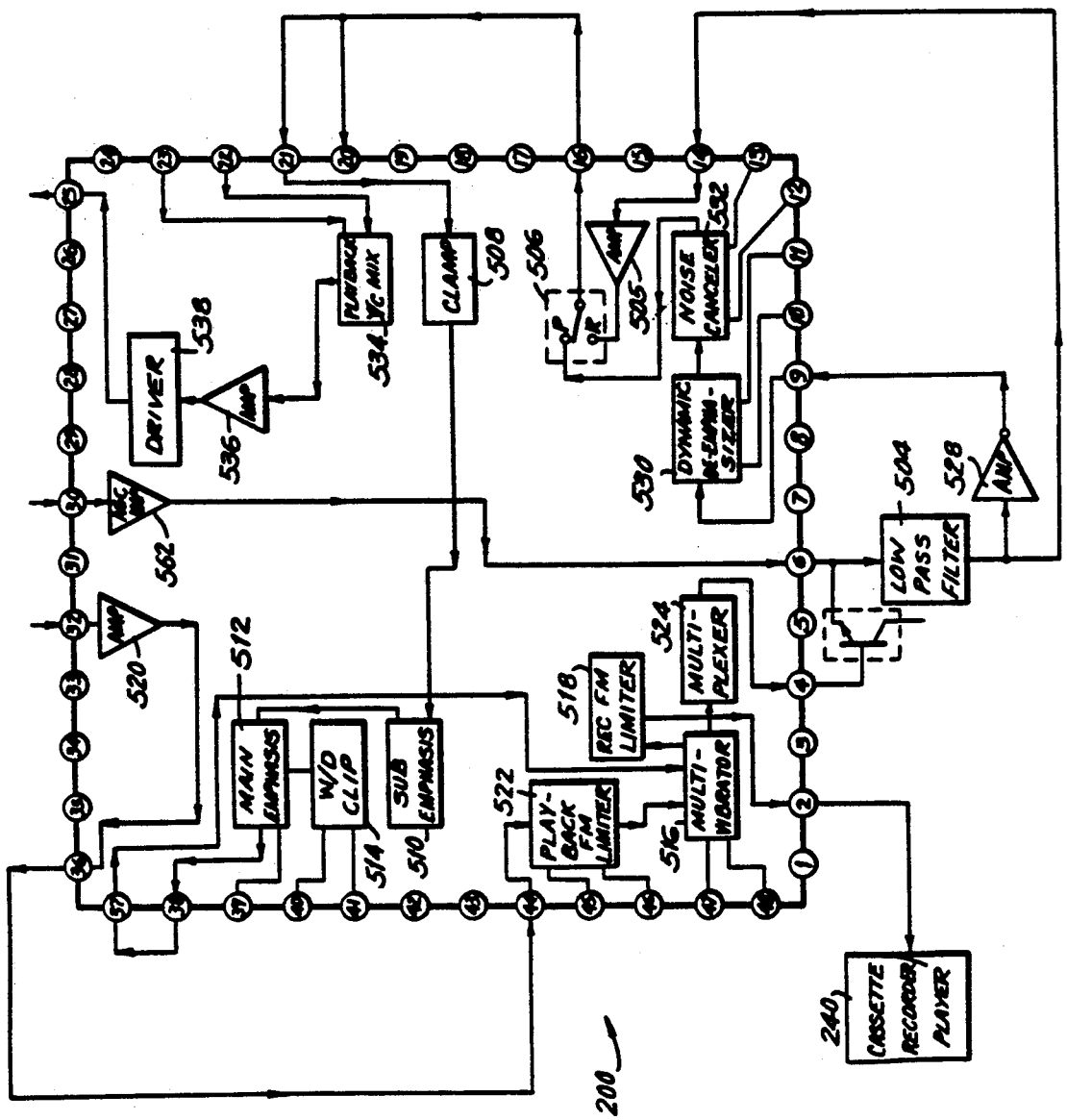
FIG. 7 is a functional block diagram of the video cassette recorderportion of the camcorder circuitry.

Reference is next made to FIG. 7 wherein a circuit diagram of VCR circuit 200 constructed in accordance with a preferred embodiment of the invention is depicted. VCR circuit 200 has a variety of input and output pins or terminals. These will be referred to by terminal number in the following discussion. In the record mode VCR circuit 200 receives the output from CCD array preamplifier 190 at input terminal 30. The input signal is input to an automatic gain control amplifier. The automatic gain control amplifier improves the sensitivity of the CCD array to varying levels of light input by amplifying the signal for greater dynamic range. The signal then passes out of terminal 6 through a low pass filter 504. Low pass filter 504 has a cut-off frequency of about 90 kHz. The filtered signal then enters terminal 14 and amplifier 505 and a switch 506, which selects between the playback and record modes. From switch 506 the signal exits chip 200 through exit terminal 16 and reenters at input terminal 21. Clamp 508 clamps the video signal assuring that the sync signals are at the specified value. The signal is next transmitted to sub emphasis circuit 510 which amplifies the high frequency portion of the signal. Sub emphasis circuit 510 outputs the signal to main emphasis circuit 512 which is coupled to white/dark clip 514. White/dark clip 514 in conjunction with main emphasis circuit 512 assures that the white and black voltage levels in the video signal are at the appropriate value. The main emphasis circuit 512 also further amplifies the high frequency components which are easily lost in the recording process. The emphasized signal then exits circuit 200 at terminal 38 and reenters at terminal 37 where it is coupled to multivibrator 516. Multi-vibrator 516 is a voltage controlled oscillator which is modulated by the video signal to produce an FM signal. The FM signal is passed through a record FM limiter 518 which limits the peak value of the FM signal to avoid oversaturating the tape. This is a dynamic range compression. This signal is then output from terminal 2 of VCR circuit 200 to cassette recorder/player 240.

In this way the video signal produced by light contacting CCD array 160 is converted into a frequency modulated signal and stored on audio tape in a cassette recorder operating at an augmented speed. Cassette recorder/player 240 is a stereo unit having two channels available for recording purposes. In the preferred embodiment the video signal is stored on one channel of the tape and the audio signal is stored in real time on the second channel. As a result, during playback the audio signal is played back in precisely the same way as on a standard stereo cassette player. On the other hand the second channel containing the video images must be separately processed.

Figure 8:
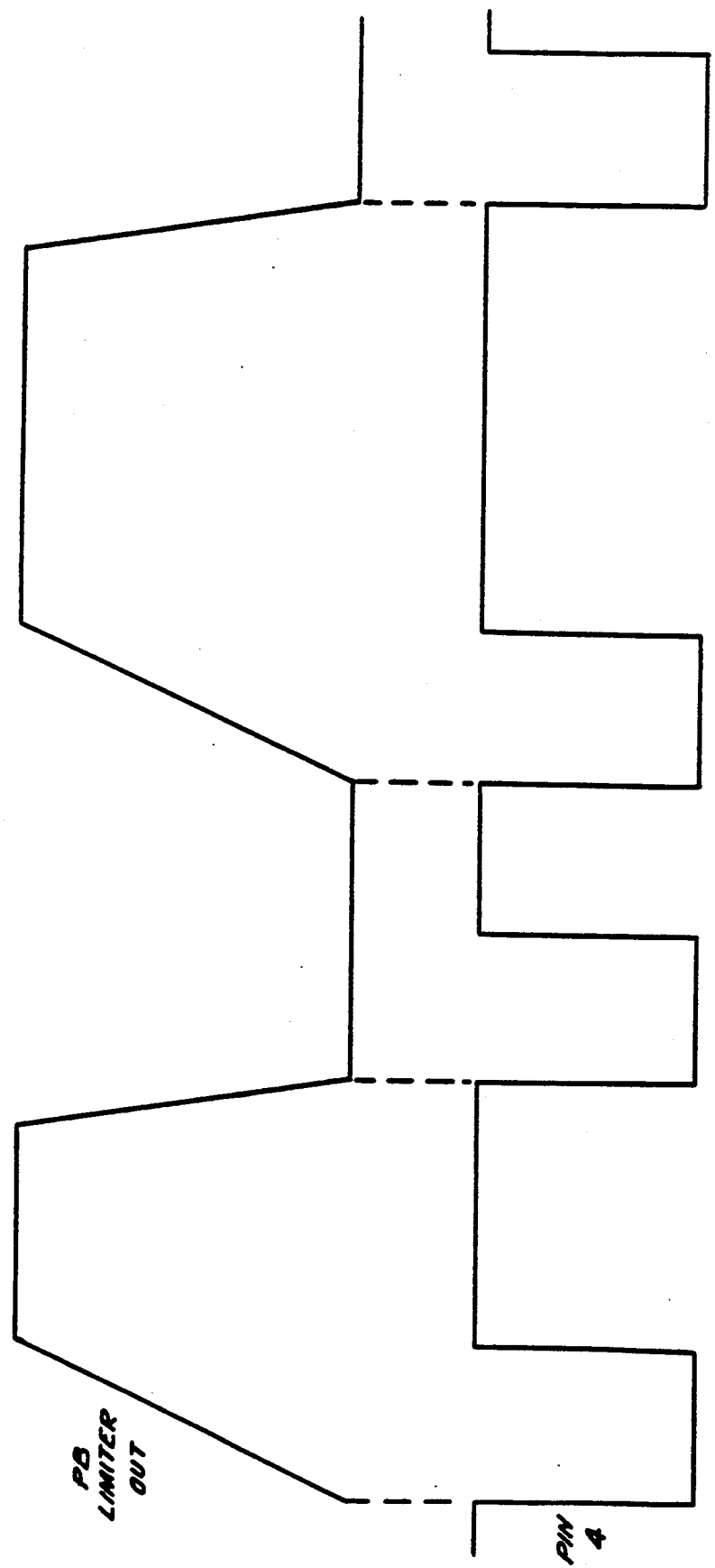
FIG. 8 is a graph comparing signals within the system.

As shown in FIG. 2 when cassette player 240 is in its playback mode the output of the channel storing the video information passes through coil 230, switch 220 and playback preamplifier 250 prior to entering VCR circuit 200 at video input 204. Video input 204 corresponds to terminal 32. The stored signals, amplified by amplifier 520, leaves VCR circuit 200 at output terminal 36 and reenters at input terminal 44 to enter the playback FM limiter 522 which minimizes the effects of amplitude variation due to tape characteristics. The signal is then input to multivibrator 516 and then into a multiplexer 524. As shown in FIG. 8 the video signal is a frequency modulated digital signal. However, the signal output at output terminal 4 of VCR circuit 200 is a pulse width modulated digital signal. This pulse width modulated signal output from terminal 4 drives transistor 526 to produce an analog video signal which is fed into low pass filter 504. Due to the positioning of switch 506 the signal output from low pass filter 504 enters amplifier 528 which adjusts the gain to make the amplification of the record and playback signals equal. The amplified signal then enters circuit 200 at terminal 9 where it enters a dynamic deemphasizer circuit 530 which deemphasizes the high signals emphasized by sub-emphasis circuit 510 and main emphasis circuit 512 in the recording process to provide natural gray tones. Next, the video signal enters a noise cancellation circuit 532 which utilizes a differential amplifier circuit to eliminate noise in a conventional manner. The signal next passes through switch 506 out terminal 16 and in playback input terminal 22. The signal enters a playback luminance/chroma mixer which is utilized for adjustment of colors. In video terminology Y=brightness or luminance level and C=color or chroma information. In a first preferred embodiment a black and white television picture is provided. However, the system is easily configured for a color system. The signal then enters an amplifier 536 and a driver circuit 538 prior to being output at terminal 25. The signal which is output is an automatic gain controlled video output signal corresponding to the signal output from terminal 205 in FIG. 2.

As described above, this analog signal is converted from an analog to a digital signal, input to one of the two frames of memory in RAM 280 and then output to television 310 through a D/A converter 290 and RF modulator 300. While the system is shown in FIG. 2 with a standard television set, a dedicated monitor which does not require an RF modulator may be also used.

Resistors and capacitors utilized in conjunction with VCR circuit 200 for biasing or timing circuit purposes in accordance with standard practice have not been added for clarity of description. In a preferred embodiment VCR circuit 200 is a Sanyo LA 7306M VLSI chip. Other comparable chips or discrete components can be utilized to perform the same function.

Figure 9:
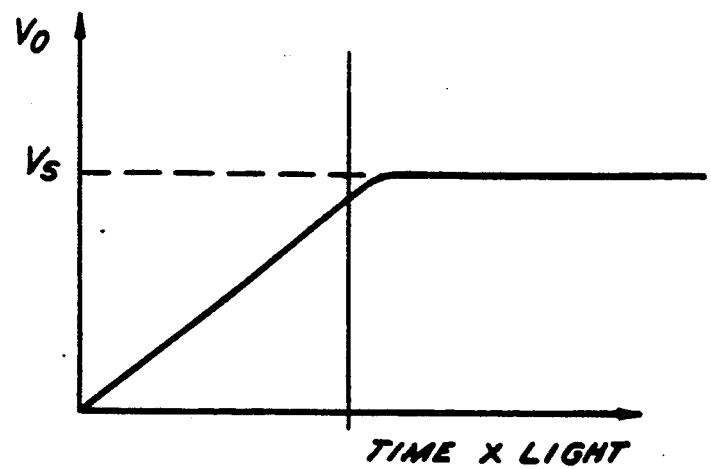
FIG. 9 is a graphical comparison of the output voltage as a function of the product of the incident light and time of exposure.

Reference is next made to FIG. 9 wherein a graph showing the relationship between the output voltage $V_0$ and the product of the intensity of incident light and time is shown for a CCD array. As shown, the output voltage $V_0$ increases linearly as the product of the time and light increases up to a saturation voltage VS. Above the saturation voltage there is no significant additional output voltage for additional incident light. As a result, it is desireable to operate the CCD array in the linear portion of the curve. In relatively low light situations the CCD array will normally operate in the linear range. However, as the brightness of the light increases such that the product of the brightness of the light and the sampling period for each pixel extends into the saturation region, a loss of the gray scale in the black and white embodiment and a lack of color distinctiveness in the color embodiment results.

Thus, in a high light situation the CCD array can be made to operate in its linear range only by reducing the intensity of the light or reducing the sampling period for the CCD array. Varying the intensity of the light is difficult, cumbersome and not well suited to rapid and constant adjustment. In a changing light situation it is desireable to constantly adjust the time of exposure of the CCD array.

Figure 10:
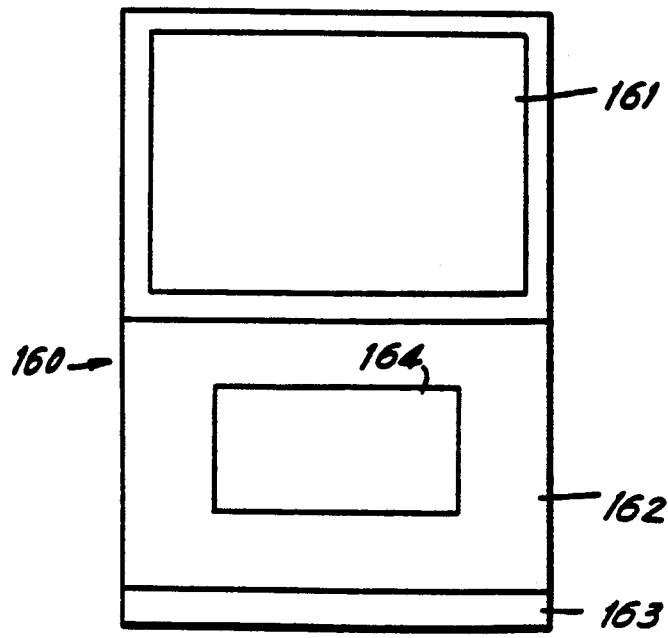
FIG. 10 is a block diagram of the CCD array.

Reference is next made to FIG. 10 wherein a block diagram of a CCD array chip 160 constructed in accordance with the referred embodiment of the invention is depicted. Chip 116 includes a charge coupled device image area 162 with 120 columns and 90 rows or lines. Image lines 1 through 90 are represented by $I_1, I_2, \ldots I_{90}$. Chip 160 also includes a storage area 162 and a shift register circuit 163. The lines in storage area 162 are likewise identified as $S_1, S_2, \ldots S_{90}$. Shift register 163 is designed to shift the 90 lines of video information from image area 161 to storage area 162, from which it can be read out. However, shift register 163 also can shift data in the opposite direction. In the ordinary course of operation the signal created in image area 161 is shifted to occupy the 90 lines of storage area 162 under the control of a 15 Hz clock. However, there are situations in which the light contacting the image area 161 during the 1/15th of a second extends into the saturation region.

The CCD array does not operate at the standard TV rate. As a result, the components do not have to function at the extremely high operating speeds of standard TV components and there is time to inexpensively process the data.

To appropriately adjust the exposure time of the CCD array for operation in the linear rather than the saturation region, an auto irising area 164 is established within storage area 162. The auto irising area 164 in a preferred embodiment is the center 40% of the image or storage areas. The signals in this auto irising area is integrated and compared with an optimal value. Based on this comparison a determination is made whether the exposure time should be increased or decreased. The time required to transfer a frame of data from image area 161 to storage area 162 is significantly less than the exposure time. For example, in the preferred embodiment the CCD array shifts 90 lines of image data in about 40 μs whereas the CCD array integrates the incident light for about 60 ms, a ratio of 1:1500.

If the integration of the auto irising section 164 determines that the CCD array is being overexposed to incident light, at an appropriate time, the shift register performs a reverse transfer transferring a "black" signal to all 90 lines $I_1$-$I_{90}$ of the image area 161. This has the effect of causing whatever image has already been stored in the image area to migrate upward and off of the image area. To assure that the voltage does not accumulate on the upper rows of image area 161 the reverse transfer generally transfers several additional "black" lines into image area 161. After the reverse transfer is completed image area 161 again begins integrating the light received at each of the pixel locations.

If too much light is detected in the integration of the auto irising area, the time at which the reverse transfer operation occurs is delayed to later in the 15 Hz cycle. This results in the exposure time during which the CCD array integrates light for transfer to the storage area to be reduced. On the other hand, if the integration of the auto irising area determines that the CCD array can integrate additional light without saturating, the period during which the CCD integrates light for transfer to the storage area can be increased. This is achieved by performing the reverse transfer operation earlier in the 15 Hz cycle.

In a preferred embodiment the auto irising system is capable of adjusting the exposure time to 90 levels, one level each frame. This 90:1 irising is equivalent to about 6 F stops of adjustment. The automatic gain control amplifiers in VCR circuit 200 adds two more F stops of adjustability. Further, by adding a mechanical optical filter in the optical path the filter can act as an indoor-outdoor switch which shifts the CCD array's sensitivity between the range of lighting generally encountered indoors and outdoors. If the system is set for the indoor position, and there is too much light even with the maximum auto irising adjustment, the camcorder can signal the user to change the indoor-outdoor switch from the indoor position to the outdoor position. Likewise, under low light situations the camcorder can alert the user to shift the indoor-outdoor switch from the outdoor position to the indoor position. This further expands the breadth of F stops in which the camcorder can be effectively utilized.

Additional lenses such as telephoto, zoom and wide angle lenses can be added to the camcorder, either separately or on a rotatable ring in the unit. Add on components such as a playback light or playback monitor can also be added to the camcorder.

Accordingly, a camcorder which utilizes a small matrix CCD array which operates slower than the standard TV rate is provided The resolution of the smaller array is entirely sufficient for many applications and provides the benefit of increased time for processing. This allows for significant signal manipulation, such as the auto irising adjustment, which replaces manual systems for adjusting incident light levels and minimizes the need for constant light conditions. The rate conversion between the slow scan CCD array and the high speed standard video signal is performed using the ping-pong RAM as a high speed video source.

Accordingly, a high quality, lower resolution camcorder, which minimizes the need for user adjustment while maintaining uniformly high quality reproduction with simple components at extremely low cost is provided.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. A video apparatus for storing video images on a recording medium comprising:
   camera means for converting light images into electrical video signals;
   processing means coupled to the camera means including means for converting the electronic video signal into a low bandwidth frequency modulated analog storage signal with a bandwidth substantially lower than a standard television video signal; and
   recording means coupled to the processing means for storing the low bandwidth frequency modulated analog storage signal on an audio cassette having a standard speed allowing storage of an audio bandwidth signal, the recording means including drive means for driving the audio cassette at higher than normal speed to increase the bandwidth storage capacity of the audio cassette and recording head means for storing the low bandwidth frequency modulated analog storage signal on the audio cassette.

2. The video apparatus of claim 1 wherein the camera means include lens means for focusing light and first integrator means for integrating the light focused by the lens means and said camera means inputting the electrical video signals directly to the processing means.

3. The video apparatus of claim 2 wherein the integrator means is a charge coupled device array for separately integrating the light incident on a matrix of pixels and producing a discrete electrical signal representative of the light incident on each pixel.

4. The video apparatus of claim 2 wherein the first integrator means in a charge coupled device having image sensing means for separately integrating the light incident on a matrix of pixels and producing discrete electrical signals representative of the light incident on each pixel, image storage means for storing a previously integrated matrix of pixels and shift control means for controlling movement of electrical signals between the image sensing means and the image storage means.

5. The video apparatus of claim 4 wherein the charge coupled device has a 90×120 pixel matrix.

6. The video apparatus of claim 2 wherein the lens means focuses light incident from about 1 inch to infinity without adjustment.

7. The video apparatus of claim 2 wherein the lens means focuses light from about 1 inch to infinity without adjustment.

8. The video apparatus of claim 1 further comprises audio storage means for storing a real-time audio signal on the audio cassette.

9. The video apparatus of claim 8 wherein the audio storage means includes microphone means for collecting sounds and converting them into an audio signal and processing means for outputting a storable signal to the recording head means.

10. The video apparatus of claim 9 wherein the audio cassette has two discrete channels, the video signals being stored on one channel and the audio signal being stored on the other channel.

11. The video apparatus of claim 1 wherein the drive means drives the audio cassette at about 8 times the normal speed.

12. The video apparatus of claim 1 wherein the processing means is a video cassette recording circuit.

13. The video apparatus of claim 1 wherein the low bandwidth frequency modulated storage signal has a bandwidth of about 100 kHz.

14. The video apparatus of claim 1 wherein the low bandwidth frequency modulated storage signal has a bandwidth of 90 kHz.

15. A video apparatus for storing video images on a recording medium and replaying same on a video display, comprising:
    camera means for converting light images into electrical video signals;
    processing means coupled to the camera means including means for converting the electronic video signals into a low bandwidth frequency modulated analog storage signal with a bandwidth substantially lower than a standard television video signal;
    recording means coupled to the processing means for storing the low bandwidth frequency modulated analog storage signal on an audio cassette having a standard speed allowing storage of an audio bandwidth signal, the recording means including drive means for driving the audio cassette at higher than normal speed to increase the bandwidth storage capacity of the audio cassette and recording head means for storing the low bandwidth frequency modulated analog storage signal on the audio cassette; and
    switching means for switching the video apparatus from a record mode where video images are stored on an audio cassette to a playback mode where the stored images are read off the audio cassette and displayed on the video display, the recording means further comprising playback head means for converting the stored signal to a playback low bandwidth frequency modulated analog storage signal in playback mode when the drive means drives the audio cassette, said processing means in the playback mode further comprising means for converting the playback low bandwidth frequency modulated analog storage signal to an analog low bandwidth video signal, and output means for converting the low bandwidth video signal to a higher frequency standard television bandwidth video signal to be displayed on the video display.

16. The video apparatus of claim 15 wherein the output means includes analog-to-digital conversion means for converting the low bandwidth video signal to a digital low bandwidth video signal; digital storage means coupled to the analog-to-digital conversion means including memory means for storing two complete frames of digital low bandwidth video signal, one frame being a storage frame and the other frame being an output frame, and control means for instantaneously repeatedly outputting the contents of said output frame of the digital low bandwidth video signal as a digital standard television bandwidth video signal until the storage frame has stored a complete frame of digital low bandwidth video signal, and then making said output frame said storage frame and making said storage frame said output frame; and digital-to-analog conversion means coupled to the digital storage means for converting the digital standard television bandwidth video signal to an analog standard television bandwidth video signal suitable for display on a monitor.

17. The video apparatus of claim 16 further comprising a radio frequency modulator coupled to the digital-to-analog conversion means for converting the analog standard television bandwidth video signal to a standard television video signal adapted to be received by a television set.

18. The video apparatus of claim 16 wherein the digital storage means includes a random access memory.

19. The video apparatus of claim 16 wherein the control means outputs the contents of the output frame of the digital low bandwidth video signal more than once before the storage frame has stored a complete frame of digital low bandwidth video signal.

* * * * *